United States Patent [19]
Wetzel

[11] Patent Number: 4,516,645
[45] Date of Patent: May 14, 1985

[54] LOAD CHECKING ARRANGEMENT FOR A CENTER-LOADED TYPE LOAD CELL

[75] Inventor: Donald C. Wetzel, Berea, Ohio
[73] Assignee: Quest Corporation, Macedonia, Ohio
[21] Appl. No.: 549,671
[22] Filed: Nov. 7, 1983

Related U.S. Application Data

[63] Continuation-in-part of Ser. No. 314,361, Oct. 23, 1981, Pat. No. 4,413,691.

[51] Int. Cl.³ .................. B66C 1/40; G01G 21/12
[52] U.S. Cl. ........................... 177/147; 177/255; 177/DIG. 9; 73/862.56
[58] Field of Search ......... 177/211, 147, 255, DIG. 9; 73/862.65, 862.66, 862.56

[56] References Cited

U.S. PATENT DOCUMENTS

| | | | |
|---|---|---|---|
| 3,290,931 | 12/1966 | Fowkes et al. | 177/211 X |
| 3,695,096 | 10/1972 | Kutsay | 73/862.66 X |
| 3,754,438 | 8/1973 | Matson | 73/862.65 |
| 3,827,514 | 8/1974 | Bradley | 177/211 X |
| 3,879,998 | 4/1975 | Bradley | 177/211 X |

Primary Examiner—George H. Miller, Jr.
Attorney, Agent, or Firm—Pearne, Gordon, Sessions, McCoy, Granger & Tilberry

[57] ABSTRACT

A weighing system has a load-bearing member attached to and supported by support means. A plurality of center-loaded type load cells are fixed on the load bearing member. A plurality of load rods are provided, each load rod extending across one of the load cells. Each load rod has a centering recess therein. A load supporting member is supported on the load rods. The load supporting member is capable of lateral movement with respect to the load bearing member. The centering recess of the load rod tends to urge the load supporting member to its original position. The weighing system is disclosed for use in a sheave block weighing assembly. The weighing system provides a self-centering arrangement which permits lateral movement without the necessity of movable load cells and without the use of check rods or flexure plates which could result in weighing inaccuracies.

22 Claims, 9 Drawing Figures

LOAD CHECKING ARRANGEMENT FOR A CENTER-LOADED TYPE LOAD CELL

CROSS-REFERENCE TO RELATED APPLICATION

This application is a continuation-in-part of application Ser. No. 314,361, filed Oct. 23, 1981, now U.S. Pat. No. 4,413,691, issued Nov. 8, 1983.

BACKGROUND OF THE INVENTION

1. Field of the Invention

This invention relates to weighing systems having a plurality of electronic load cells, and in particular to such weighing systems in which the load cells are of a center-loaded type which is subjected to side loading.

2. Description of the Prior Art

Weighing systems are commonly used with material handling apparatus, such as ladle crane hangers and scrap chargers, which convey loads which are unevenly distributed over the material handling surface.

A weighing system in conjunction with a ladle crane hanger permits the operator to know how much molten metal is initially in the ladle and how much remains after each pour. In practice, the load cells in the weighing system sense the weight loss of the molten metal leaving the ladle when pouring the ingots and, through appropriate electronics, display this weight loss as the weight of the ingot which has been poured. Knowing the weight of the molten metal is very important in pouring ingots to an accurate weight. Ingot molds erode internally with use over a period of time, and the practice of pouring an ingot to a mark on the mold does not produce an accurate ingot weight. By knowing the weight of the molten metal being poured, the ingot can be poured to an exact ordered weight rather than to an estimated weight. This information also enables the operator to determine when there is not enough molten metal remaining for another ingot, and thereby presents the waste of an ingot due to an insufficient amount of metal.

In the case of ladles containing scrap metal knowing the exact amount of scrap metal being charged into the steel-producing furnace improves the control of the recipe and, therefore, the quality of the steel produced. This is also the case when charging the furnace with molten iron.

Despite the advantages of using a weighing system in a material handling apparatus, serious disadvantages exist which may render the weight measurements inaccurate. Loads handled by the ladle crane hangers and scrap chargers do not have a uniform distribution of weight over the material handling surface. In many prior weighing systems, this uneven load distribution rendered the weighing systems inaccurate or unusable for many purposes. The uneven load distribution often causes the limits of a particular cell or cells to be encountered. When this occurs, the reading transmitted from that cell is highly inaccurate and non-repeatable. Inaccurate readings of the weight of molten steel in a ladle can result in scrap ingots due to an insufficient amount of steel. The economic consequences of such errors can be serious.

One attempt to overcome these problems is illustrated in U.S. Pat. No. 3,899,034, issued to Polen et al. In this patent, a weighing system is disclosed which was comprised of two fixed load cells at one side of the sheave block and two movable load cells at the opposite side of the sheave block. Each of the load cells was a conventional columnar compression load cell which had to be loaded vertically and could not withstand side loading. The movable cells were intended to adjust the load distribution to avoid side loading. However, the movable load cells produced an instability which usually required devices such as check rods to protect the load cells and to assure that no contact existed between the ladle hook support structure and the sheave basket. Any contact between the sheave basket and the ladle hook support structure other than a vertical force or load applied to the load cells would absorb load and manifest itself as an inaccuracy in the sensed weight or cause non-repeatable load variation when dynamic conditions were encountered, such as the moving of the crane, the placing of the ladle hanger on the ground for maintenance, or the raising of the ladle hanger. While the load-absorbing characteristics of the check rods were predictable, the check rods could still reduce the accuracy of the weight sensing devices.

One approach to eliminating the disadvantages of these check rods is disclosed in patent application Ser. No. 314,361, filed Oct. 23, 1981, now U.S. Pat. No. 4,413,691, of which this application is a continuation-in-part. In that application, three fixed bending beam load cells were arranged in a stable three-point configuration which eliminated the need for check rods, and therefore, improved the accuracy of the weight distribution. However, since a point contact was used at each of the three points, a certain amount of lateral movement of the ladle hook support structure was possible. This movement could cause contact with the load cell transducer by the support collar on which the ladle hook support structure was supported. The result of this contact would be load absorption which subsequently would manifest itself as an inaccuracy in the sensed weight, and hence an inaccurate measured weight displayed to the operator.

In order to stop or inhibit this lateral sliding, application Ser. No. 314,361 disclosed the use of flexure plates mounted on the bottom of the sheave basket on each side which were attached to the ladle hook support structure. The flexure plates maintained a fixed distance between the ladle hook support structure supported on the load cell support collar and the sheave basket upon which load cell transducers were mounted. Another method to hold the relative position between the sheave basket and the ladle hook support structure was the use of check rods. Flexure plates and check rods were installed so that they are in a bending mode vertically and in a compression or tension mode horizontally. These devices always introduced inaccuracies to the system. Even when the load absorbing characteristics of the flexure plates or the check rods were predictable, these devices still reduced the accuracy and repeatability of the readings. A further disadvantage of check rods and flexure plates is that they invariably became loose and were generally unreliable. Due to the construction of the sheave block assembly, it is very difficult, or almost impossible, to gain access to the check rods to assure that they were tight. Due to the shock and vibration encountered in the environment in which the ladle hanger operated, the check rods and flexure plates invariably became loose and caused great sensed weight variations and could result in potential damage to the load cell transducer.

SUMMARY OF THE INVENTION

These and other disadvantages of the prior art weighing systems are overcome by the present invention. The present invention comprises a weighing system using fixed center-loaded type load cells capable of withstanding side loading which employ a self-centering configuration which eliminates the need for flexure plates or check rods, and therefore improves the accuracy of the weight determination. By eliminating check rods and flexure plates, the associated maintenance problems are also eliminated.

In accordance with the present invention, each load rod which extends across and is supported upon one of the load cells is provided with a centering recess. If the load supporting member which is supported on the load rod begins to move laterally, the load rod will temporarily ride up the load cell recess. However, the force of gravity on the load supporting member will cause the member to return to its center position so that it automatically centers itself on the load cell.

The load cells are preferably mounted on each side of the sheave basket assembly and at one end. Preferably, the bending beam transducers of the load cells are oriented 90° to each other to improve stability. The three load cells are preferred, since the three-point configuration is self-leveling and allows for anomalies which occur in fabrication. In addition, the need to shim any individual cell is reduced or eliminated. The present invention also reduces the adverse effects of heat encountered by the ladle hanger. All load transducers react adversely to high ambient heat. Heat is encountered when ladles of molten metal are handled. The heat is transmitted to the load cells by two methods—radiation and conduction. The load sensing transducers of the present invention are located further from the heat source than with other systems, and thus the effects of radiation are reduced.

These and other advantages are accomplished by the present invention of a weighing system which comprises a load-bearing member attached to and supported by support means. A plurality of center-loaded type load cells are fixed on the load bearing member. A plurality of load rods are provided with one of the load rods extending across each of the load cells. Each load rod has a centering recess therein. A load supporting member is supported on the load rods. The load supporting member is capable of lateral movement with respect to the load bearing member. The centering recess of the load rod tends to urge the load supporting member back to its original position with respect to the load bearing member which such lateral movement occurs.

The load cells are preferably each center-loaded bending beam load cells which are capable of absorbing side loading equal to their full scale load capacity. The centering recess is preferably formed on the bottom surface of the load rod where the load cell contacts the load rod.

DETAILED DESCRIPTION OF THE PREFERRED EMBODIMENTS

Figure 1:
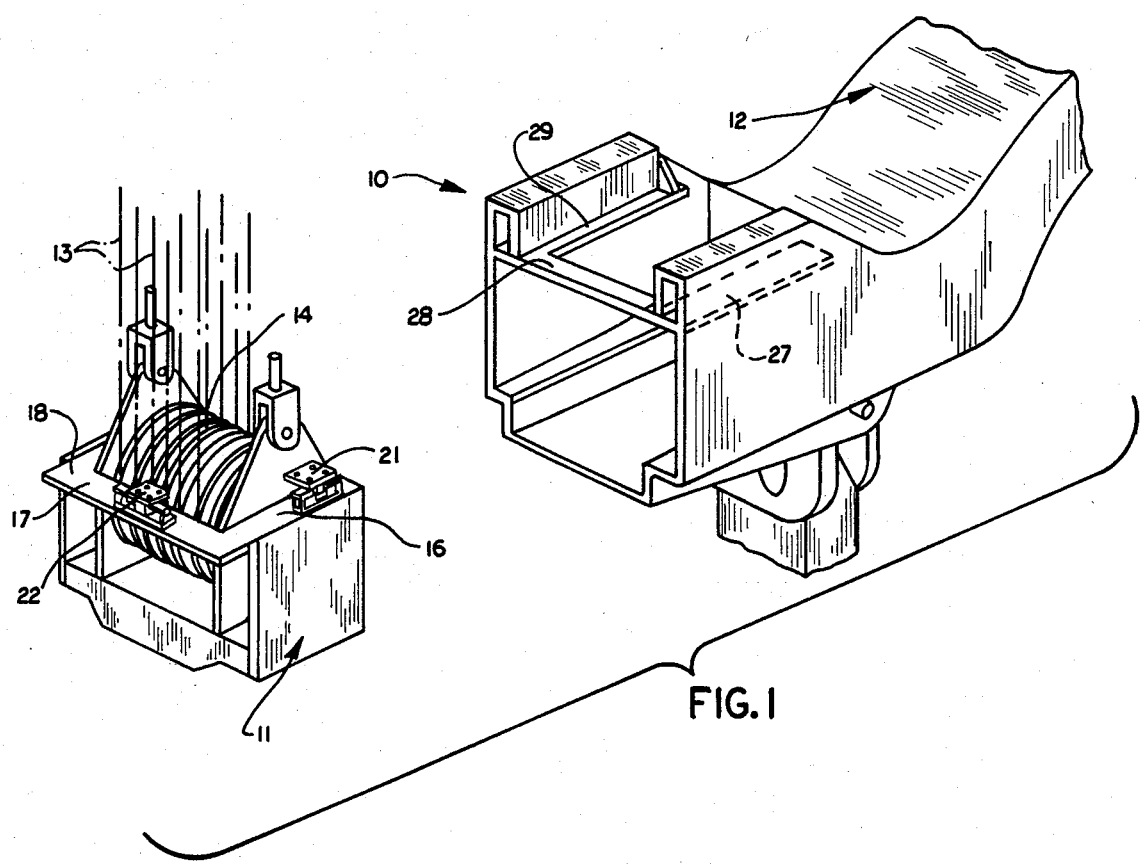
FIG. 1 is a perspective view of a ladle crane hanger with a sheave basket removed therefrom, showing components of the weighing system of the present invention.
Figure 2:
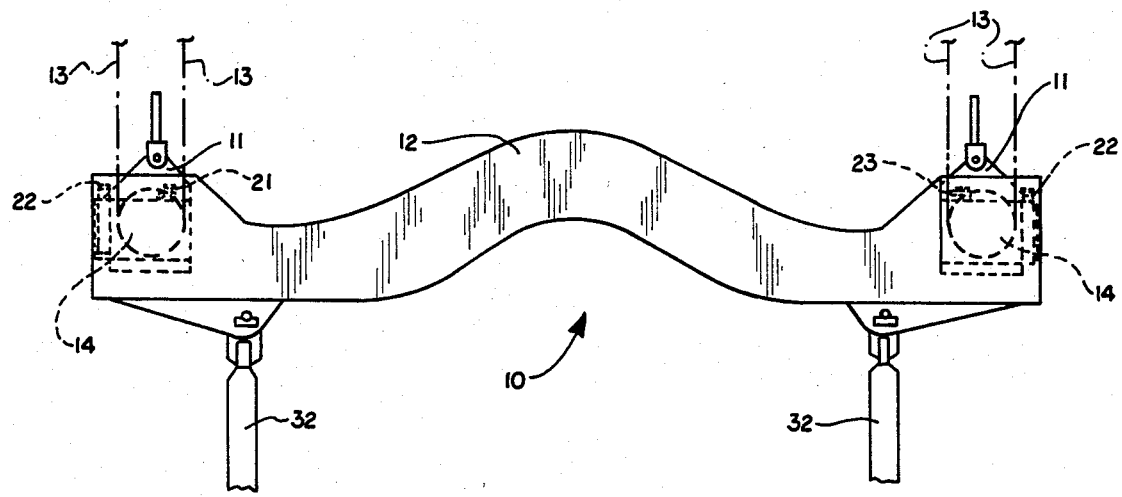
FIG. 2 is a side elevational view of the entire ladle crane hanger of FIG. 1 with both sheave baskets in place.

Referring initially to FIG. 1, there is shown a portion of a ladle hanger assembly 10 comprising a sheave basket 11 which is inserted into one end of a ladle hook support 12. The sheave basket 11 is a load-bearing member, and the ladle hook support 12 is a load supporting member. Lifting ropes 13 mounted on sheaves 14 in the sheave basket 11 support the ladle hanger assembly and are connected to an overhead crane (not shown). The crane moves the ladle hanger assembly 10 both horizontally and vertically. The ropes 13 may not be perpendicular to the ground but may be at a slight angle. The sheave basket 11 has horizontal support ledges 16, 17 and 18. The support ledges 16 and 18 each extend along one of the sides of the sheave basket 11, and the support ledge 17 extends along one end of the sheave basket between the two side support ledges 16 and 18. When the sheave basket 11 is inserted into the ladle hook support 12, the end support ledge 17 extends in the outward direction.

Figure 3:
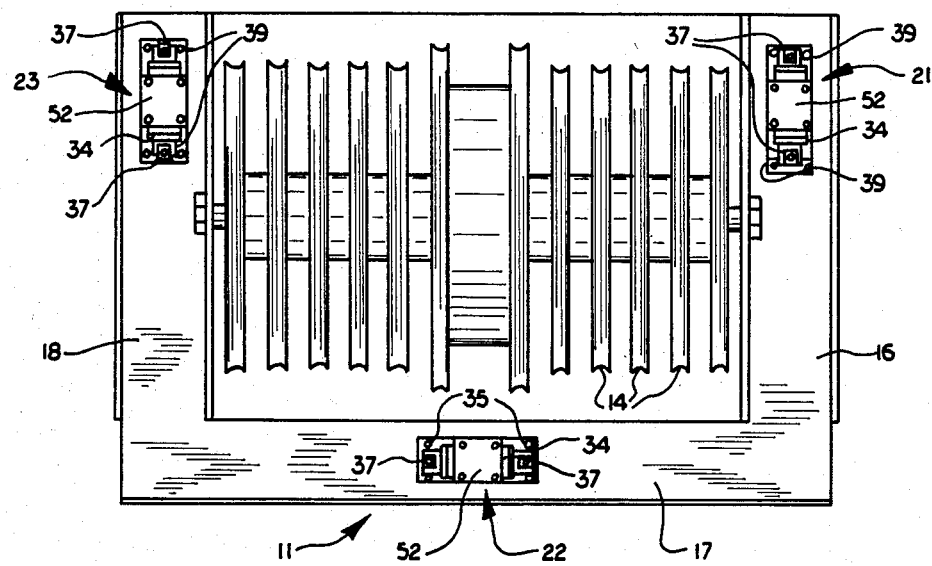
FIG. 3 is a top plan view of the sheave basket of FIG. 1 showing the location of the load cells.
Figure 4:
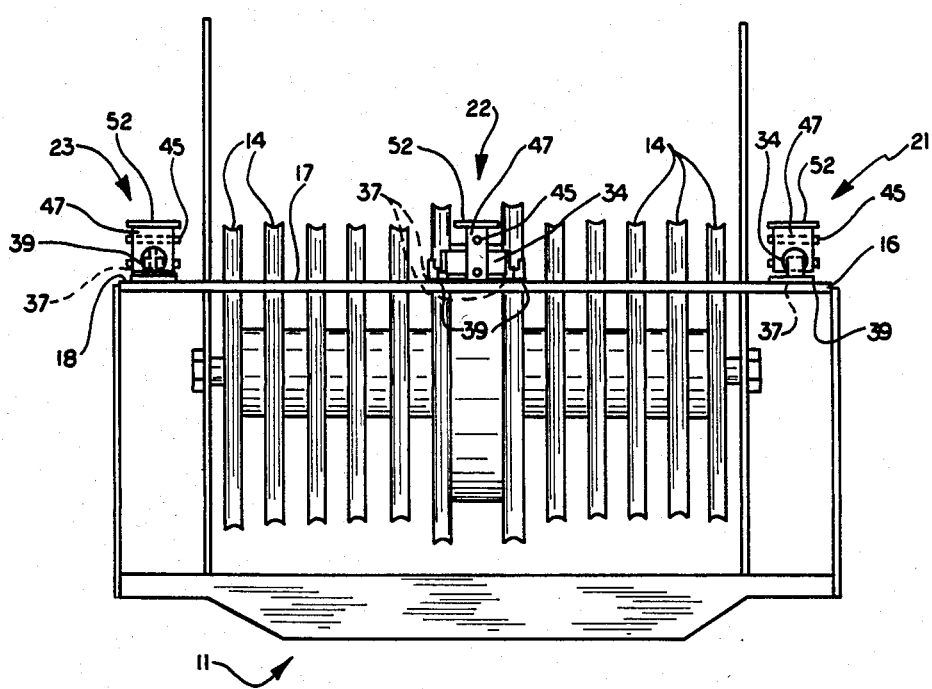
FIG. 4 is a side elevational view of the sheave basket of FIG. 3.

Three load sensor assemblies 21, 22 and 23 are fixed mounted on the support ledges 16, 17 and 18. The load sensor assembly 21 is mounted on the side of the sheave basket 11 on the support ledge 16, and the load sensor assembly 23 (FIG. 3) is mounted on the other side of the sheave basket 11 on the support edge 18. The other load sensor assembly 22 is mounted on the end of the sheave basket 11 on the support ledge 17, intermediate to the other two load sensor assemblies 21 and 23.

As shown in FIG. 1, the ladle hook support 12 has at each end a generally U-shaped support surface formed by a side support surface 27, an end support surface 28, and an opposite side support surface 29. The end support surface 28 extends between the two side support surfaces 27 and 29 along the end of the ladle hook support 12. When the sheave basket 11 is inserted in the end of the ladle hook support 12, the surfaces 27, 28 and 29 rest on the load sensor assemblies 21, 22 and 23, respectively.

Figure 6:
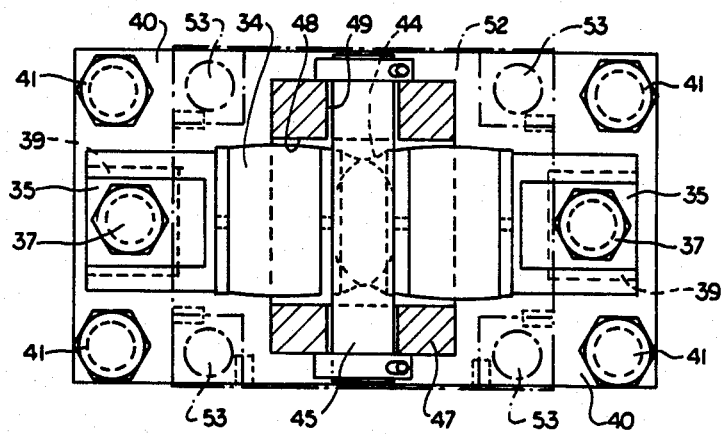
FIG. 6 is a top plan sectional view of the load beam assembly taken along line 6—6 of FIG. 5.
Figure 5:
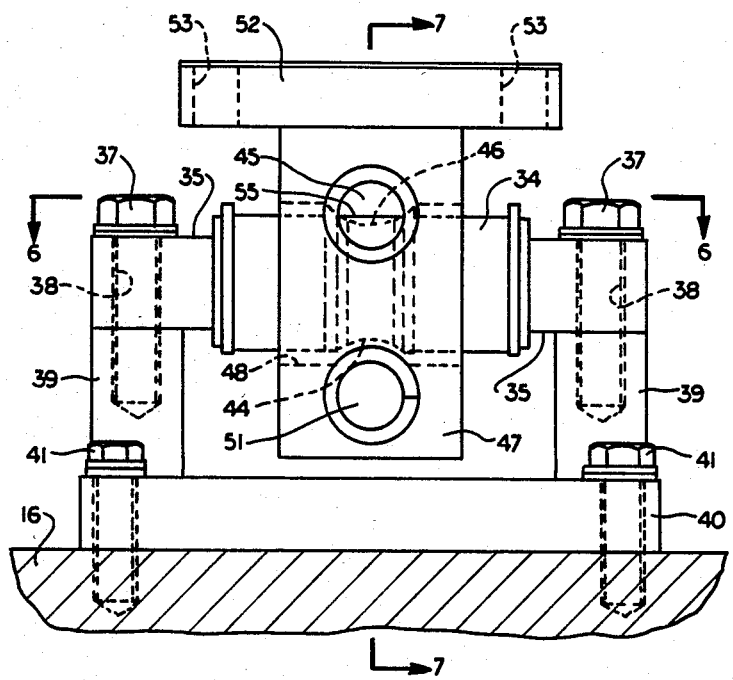
FIG. 5 is a front elevational view of one of the load beam assemblies of FIGS. 3 and 4.
Figure 7:
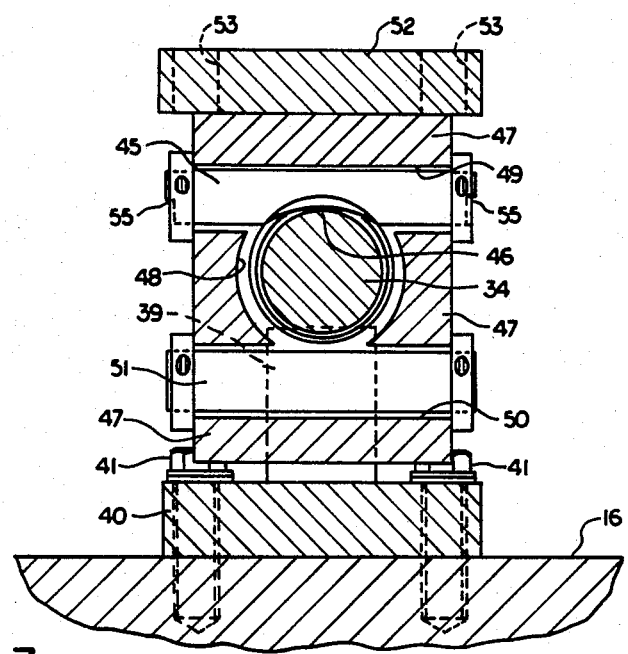
FIG. 7 is an end sectional view, taken along line 7—7 of FIG. 5.

Each of the load sensor assemblies 21-23 is identical and all will be described with respect to the load sensor assembly 21 shown in FIGS. 5-7. The load cell sensor assembly 21 comprises a load beam transducer 34 having a pair of mounting portions 35 extending on each end. The load beam transducer 34 is attached to the support ledge 16 by a pair of mounting bolts 37. Each of the bolts 37 extends through an opening 38 in one of the mounting portions 35 of the load beam transducer 34 and is threaded into the top of one of two load beam mounting pedestals 39. The two load beam mounting pedestals 39 are provided for each of the load beam transducers 34 and are mounted at each end of the load beam transducer on a load beam mounting plate 40. Each load beam transducer 34 extends between the mounting pedestals 39 and across the load beam mounting plate 40. The load beam mounting plate 40 is fixedly attached to the support ledge 16 (or to one of the support ledges 17 or 18) by a plurality of mounting bolts 41.

Preferably, the openings 38 in each of the mounting portions 35 of the load beam transducer 34 are larger than the bolts 37 so that ample clearance is provided between the inside diameter of the opening and the outside diameter of the mounting bolts to allow the load beam to deflect horizontally upon without contacting the mounting bolts 37. As the load beam experiences vertical loading, it deflects vertically so that the horizontal distance between its ends becomes shorter. The clearance between the bolts 37 and the opening 38 allows this shortening affect to occur without placing horizontal restraints on the load beam transducer 34.

Each of the load beam transducers 34 is preferably a center-loaded type load beam transducer that has side loading capacities of 100% of the load beam full scale capacity. This type of center-loaded bending beam is capable of withstanding side loading equal to the full scale load capacity without experiencing permanent damage. These load beams basically comprise double shear beams with a double-ended transducer and are sometimes utilized for high capacity platform scales. Examples of suitable load beam transducers are the Model 5103 load cell, manufactured by Transducers Inc. of Cerritos, Calif., and the Model 60058 load cell, manufactured by Sensortronics, Inc. of Covina, Calif.

Figure 8:
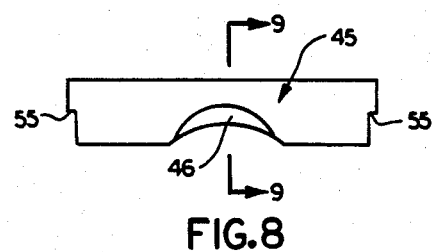
FIG. 8 is a side view of one of the load rods taken from the same perspective as FIG. 7.

Each load beam transducer 34 has a center circumferential groove 44 around the middle of the load beam. A hardened load rod 45 is positioned within the groove of the load beam transducer 34. As shown in particular in FIGS. 7 and 8, the load rod 45 is provided with a centering recess 46 along its bottom surface where the load rod contacts the circumferential groove 44 of the load beam transducer 34. The recess is in the form of a reverse saddle in the load rod 45, and the load beam transducer 34 naturally settles within the center of the groove 44, so that the rod is seated in the groove. The load rod 45 is mounted in a load beam collar 47 which extends around the load beam transducer 34. The collar 47 has a horizontal opening or bore 48 in which the load beam transducer is mounted and has a pair of openings 49 and 50 extending transversely to the bore 48. The hardened load rod 45 is mounted in the opening 49. A secondary support rod 51 is mounted in the other opening 50. The support rod 51 extends parallel to the rod 45. While the support rod 45 extends across the top of the load beam transducer 34, the support rod 51 extends beneath the load beam transducer and assures that the load cell assembly 21 will stay in a proper assembled condition when it is subjected to reverse loads, such as when the ladle hanger assembly is placed on the ground for maintenance. A bearing plate 52 is supported on top of the load beam collar 47. The bearing plate 52 may be attached to the support surface 27 (or one of the support surfaces 28 or 29) of the ladle hanger assembly 10 by attachment of bolts through openings 53.

The centering recess 46 of the load rod 45 tends to cause the load rod 45, and the collar 47 and the ladle hanger assembly supported thereon, to return to its center position in the event that exterior forces cause the ladle hanger assembly to move laterally. If such lateral movement occurs, the circumferential groove 44 of the load beam transducers 34 moves out of the center of the recess 46. The force of gravity tends to make the load rod 45 return to its center position. The radius of curvature of the recess 46 will vary depending upon the radius of the load beam transducer 34 at the center of the groove 44. Preferably, the radius of curvature of the recess 46 is greater than the radius of curvature of the load beam transducer 34 at the center of the circumferential groove 44, so that a point contact is maintained between the load rod 45 and the load beam transducer 34.

Figure 9:
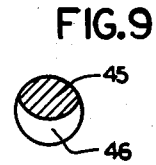
FIG. 9 is an end sectional view of the load rod taken along line 9—9 of FIG. 8.

In addition, the recess 46 is rounded in the direction traverse to the length of the rod 45, as shown in FIG. 9 and the radius of curvature in this direction is less that the radius of curvature across the groove 44, so that a point contact is maintained.

To maintain the load rod 45 in proper position with the recess 46 along the bottom surface of the load rod, positioning flats 55 are provided on the ends of the load rod 45. Each of the flats 55 engage corresponding keyed surfaces at the ends of the opening 49 in the collar 47. The flats 55 act as keepers and prevent any rotation of the load rod which would, in turn, change the point of contact between the load rod 45 and the load beam transducer 34.

It is also important to maintain proper clearance between the bore 48 of the collar 47 and the load beam transducer 34 so that the load beam transducer can move vertically with respect to the collar as lateral movement occurs and the supported load temporarily rides in the centering recess 46. Similarly, it is important that proper clearnace be provided between the support rod 51 and the load beam transducer 34.

The support surfaces 27-29 of the ladle hook support 12 are supported on top of the bearing plates 52. Each of the load sensor assemblies 21-23 is preferably mounted so that each is oriented 90° with respect to the next adjacent load cell. This orientation improves the self-checking aspects of the load cells. Each of the load sensor assemblies 21-23 is otherwise identical.

In operation, a ladle (not shown) would be lifted by means of hooks 32. The distribution of the metal in the ladle and the fact that the ropes 13 may not be vertical causes the weight supported by each hook to vary. Since each end of the ladle hook support 12 is supported by a stable three-point support system formed by the three load sensor assemblies 21-23, the load is stably supported regardless of the distribution of the load.

In addition, the stability of the load sensor assemblies 21-23 which are fixed on each sheave basket 11 rather than movable or floating, and the use of load cells which are capable of absorbing side loading equal to their full scale load capacity, and which are self centering, means that check rods, flexure plates or other devices which have previously been necessary to reduce instability of the support and to prevent lateral movement are not necessary with the present invention.

The load sensor assemblies 21-23 may be connected to a commercially available high performance analog-digital converter. A typical converter is model 710B, manufactured by Quest Corporation, of Macedonia, Ohio. The converter takes the voltage output from the load beam transducers 34 at each end of the ladle hook support 12 and converts it to a weight-in-pounds or kilograms which can be read on its own display.

While the self-centering configuration of the load cells of the present invention has been shown as applied to a ladle hanger weighing assembly, it is possible to employ the same self-centering configuration in other applications in which center-loaded type load cells are used, such as in platform scales or a sheave block assembly.

Various other modifications apparent to those skilled in the art may be made in the apparatus disclosed above, and changes may be made with respect to the features disclosed, provided that the elements set forth in any of the following claims or equivalents of such may be employed.

What is claimed is:

1. A weighing system, which comprises:
   a load-bearing member attached to and supported by support means;
   a plurality of center-loaded load cells fixed on the load bearing member;
   a plurality of load rods, each load rod extending across and supported on one of the load cells, each load rod having a centering recess therein; and
   a load supporting member supported on the load rods, the load supporting member capable of lateral movement with respect to the load bearing member, the centering recess of the load rod tending to urge the load supporting member back to its original position with respect to the load bearing member when such lateral movement occurs.

2. A weighing system as defined in claim 1, wherein the centering recess is formed on the bottom surface of the load rod where the load rod contacts the load cell.

3. A weighing system as defined in claim 1, wherein each of the load cells is a center-loaded bending beam load cell capable of aborbing side loading equal to its full-scale load capacity without permanent damage.

4. A weighing system as defined in claim 1, wherein the load rod has positioning flats to prevent rotation of the load rod.

5. A weighing system as defined in claim 1, wherein there are three bending beam load cells fixed on the load bearing member to provide a three-point support system, all three of the load cells being immovable with respect to the load bearing member.

6. A weighing system as defined in claim 1, wherein each load cell is mounted at a 90° orientation with respect to the next adjacent load cell.

7. A weighing system as defined in claim 1, comprising in addition means connected to the load cells for summing the measurements and for displaying the results therefrom.

8. A weighing system as defined in claim 7, wherein each of the load cells is a center-loaded bending beam load cell capable of absorbing side loading equal to its full-scale load capacity without permanent damage.

9. A weighing system as defined in claim 7, wherein each load cell is mounted at a 90° orientation with respect to the next adjacent load cell.

10. A weighing system as defined in claim 7, wherein the centering recess is formed on the bottom surface of the load rod where the load rod contacts the load cell.

11. A weighing system as defined in claim 7, comprising in addition means connected to the load cells for summing the measurements and for displaying the results therefrom.

12. A weighing assembly as defined in claim 7, wherein the load cells are three bending beam load cells fixed on the ledges of a sheave basket to provide a three-point system.

13. A weighing system as defined in claim 12, wherein two of the load cells are mounted one on each side of the sheave basket and the other load cell is mounted at one end of the sheave basket.

14. A weighing system as defined in claim 1, wherein the radius of curvature of the recess is greater than the radius of the load cell where the laod rod contacts the load cell, so that there is a point contact between the load rod and the load cell.

15. A weighing system as defined in claim 14, wherein the load rod has positioning flats at each end to prevent rotation of the load rod.

16. A sheave basket weighing system for a material handling apparatus comprising:
    a sheave basket having sheaves supported by lifting ropes, the sheave basket also having generally horizontally extending ledges;
    a plurality of center-loaded type load cells fixed on the ledges of the sheave basket, all of the load cells being immovable with respect to the sheave basket;
    a plurality of load rods, each load rod extending across and supported on one of the load cells, each load rod having centering recess therein; and
    a ladle hanger assembly having generally horizontally extending surfaces which are supported on the load rods.

17. A weighing system as defined in claim 16, wherein one of the load cells is positioned intermediate to the other two load cells.

18. A weighing system, which comprises:
    a load-bearing member attached to and supported by support means;
    a load supporting member supported by the load-bearing member;
    a center-loaded load cell positioned between the load-bearing member and the load supporting member and fixed on one of the load-bearing member and the load supporting member;
    an engaging member attached to the other of the load-bearing member and the load supporting member, the engaging member extending across and contacting the load cell to transmit the load to the load cell, the engaging member capable of lateral movement with respect to the load cell, the engaging member having a centering recess therein, the centering recess on the engaging member tending to urge the engaging member and the member supported thereby back to its original position with respect to the load cell when such lateral movement occurs and when the load is applied to the load cell.

19. A weighing system as defined in claim 18, wherein the load cell is a center-loaded bending beam load cell capable of absorbing side loading equal to its full-scale load capacity without permanent damage.

20. A weighing system as defined in claim 18, wherein there are a plurality of load cells.

21. A weighing system as defined in claim 18, wherein the engaging member has positioning flats to prevent rotation thereof.

22. A weighing system as defined in claim 18, wherein the load cell is fixed on the load bearing member and the engaging member is attached to the load supporting member.

* * * * *